J. W. BODILLY.
HORSESHOE CALK.
APPLICATION FILED APR. 1, 1912.
1,033,080.
Patented July 23, 1912.
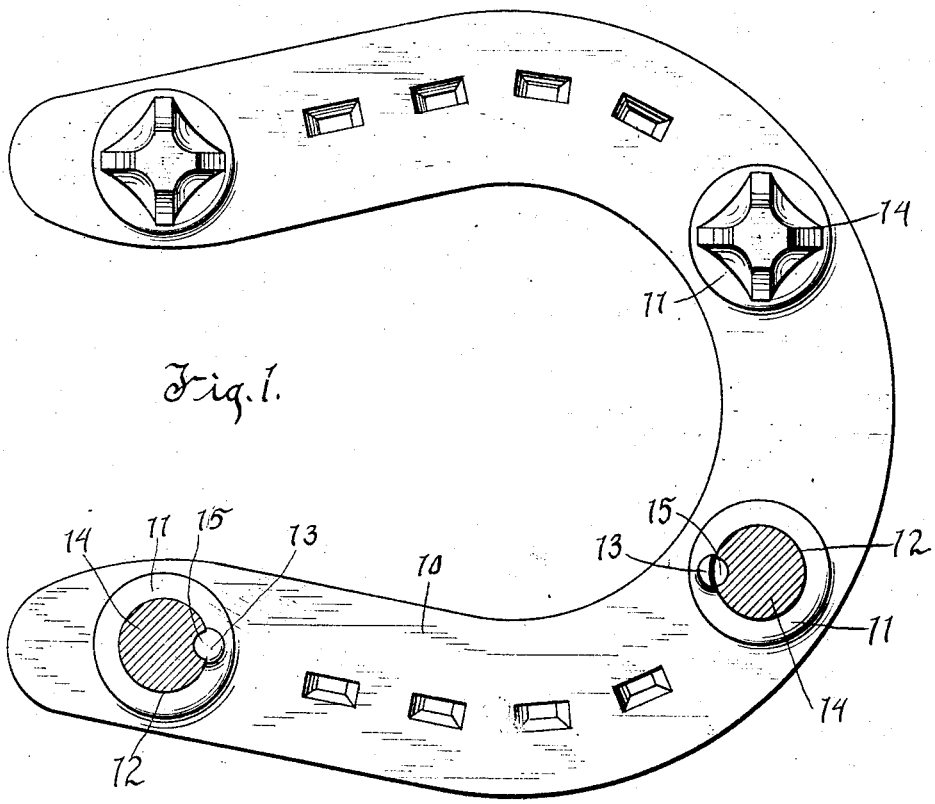

UNITED STATES PATENT OFFICE.

JOHN W. BODILLY, OF OSHKOSH, WISCONSIN.

HORSESHOE-CALK.

1,033,080.  Specification of Letters Patent.  Patented July 23, 1912.

Application filed April 1, 1912. Serial No. 687,822.

*To all whom it may concern:*

Be it known that I, JOHN W. BODILLY, a citizen of the United States, and resident of Oshkosh, in the county of Winnebago and State of Wisconsin, have invented new and useful Improvements in Horseshoe-Calks, of which the following is a description, reference being had to the accompanying drawings, which are a part of this specification.

This invention relates to a calk construction for horse shoes which will permit of the calk being readily attached and will prevent of its being accidentally removed and which prevents the turning of the calk in use.

With the above and other objects in view the invention consists in the horse shoe calk as herein claimed and all equivalents.

Referring to the accompanying drawings in which like characters of reference indicate the same parts in the different views:

Figure 1 is a plan view of a horse shoe provided with calks constructed in accordance with this invention, two of the calks being shown in section; Fig. 2 is a sectional view thereof; Fig. 3 is a detail view of one of the calks; and, Fig. 4 is a perspective view of another form of calk showing the locking recess therein.

In these drawings 10 indicates the shoe proper which at the desired places for the calks is provided with raised bosses 11 having tapering openings 12 through them and through the shoe as shown in Fig. 2. Each boss has an integral lug 13 standing up from it at one edge thereof and the calk 14 which has a tapering shank to fit the tapering opening 12 is provided with a recess 15 in the side of the shank into which the lug 13 may be driven to serve as a key for locking the calk in place. The recess 15 is of varying width with its narrow portion lowermost as shown in Fig. 3 and has its bottom or rear wall inclined in the opposite direction from the inclination of the wall of the opening 12 at the point of location of the lug 13 so that when the lug is driven over and down into the recess 15 behind the boss 11 it not only serves as a key for preventing the turning of the calk, but it constitutes a wedge fitting between oppositely inclined surfaces of the calk and the boss to effectively lock the calk in its seat against removal.

In operation the shoe is attached in the usual manner and the calks are inserted in the openings 12 and are struck with a hammer to drive them firmly on their seats, care being taken that the recesses 15 stand opposite the lugs 13. Then the lugs 13 are driven inwardly into the recesses 15 by means of a pointed tool which will reach in between the head of the calk and the boss 11 and the operation is continued until the lug is driven downwardly to fill the space between the walls of the recess 15 and the tapering walls of the calk seat. When so connected the calk is incapable of turning in its seat, the lug 13 acting as a key within the recess 15 and any outward movement of the calk is prevented by reason of the wedge like action of the lug 13 which has been forced tightly between the oppositely inclined walls of the recess and the calk seat. Any tendency of the calk to move out of its seat only serves to more tightly clamp the wedge lug 13 between the tapering side walls of the recess 15 and between the oppositely inclined walls of the calk seat and the bottom of the recess and so accidental removal of the calk is effectively prevented. By means of this calk connection, the calk may be removed when desired for substituting new calks by applying force thereto which will crowd the metal forming the key out of the way and when this has been done a new calk may be placed in position and locked by driving the lug back as before.

By means of this invention a shoe may be provided with wearing calks suitable to the season and the calks may be changed as required without the liability of the calks becoming lost or working loose.

What I claim as new and desire to secure by Letters Patent is:

1. A horse shoe provided with an opening forming a calk seat, a calk having a shank to fit the calk seat and provided with a recess of varying depth with an inclined bottom wall, and a lug on the horse shoe at the edge of the calk seat adapted to be driven into the recess and occupy the space between the wall of the calk seat and the inclined wall of the recess.

2. A horse shoe provided with a tapering opening forming a calk seat, a calk having a tapering shank to fit within the calk seat and provided with a recess in the side of its shank and with its bottom wall inclined opposite to the inclination of the wall of the calk seat, and a lug on the horse shoe at the edge of the calk seat adapted to be turned over into the recess and driven downwardly to fill the space between the inclined wall of the recess and the wall of the calk seat.

3. A horse shoe having a boss raised on the face thereof and having a tapering opening passing through it and through the horse shoe to form a calk seat, a calk having a tapering shank to fit within the calk seat and provided with a recess varying in depth and width, and a lug standing up from the boss at the edge of the calk seat adapted to be turned over into the recess and to be driven down into the contracting portion of the recess.

In testimony whereof, I affix my signature, in presence of two witnesses.

JOHN W. BODILLY.

Witnesses:
DAVID C. PINKERTON,
JOHN C. THOMPSON.